UNITED STATES PATENT OFFICE.

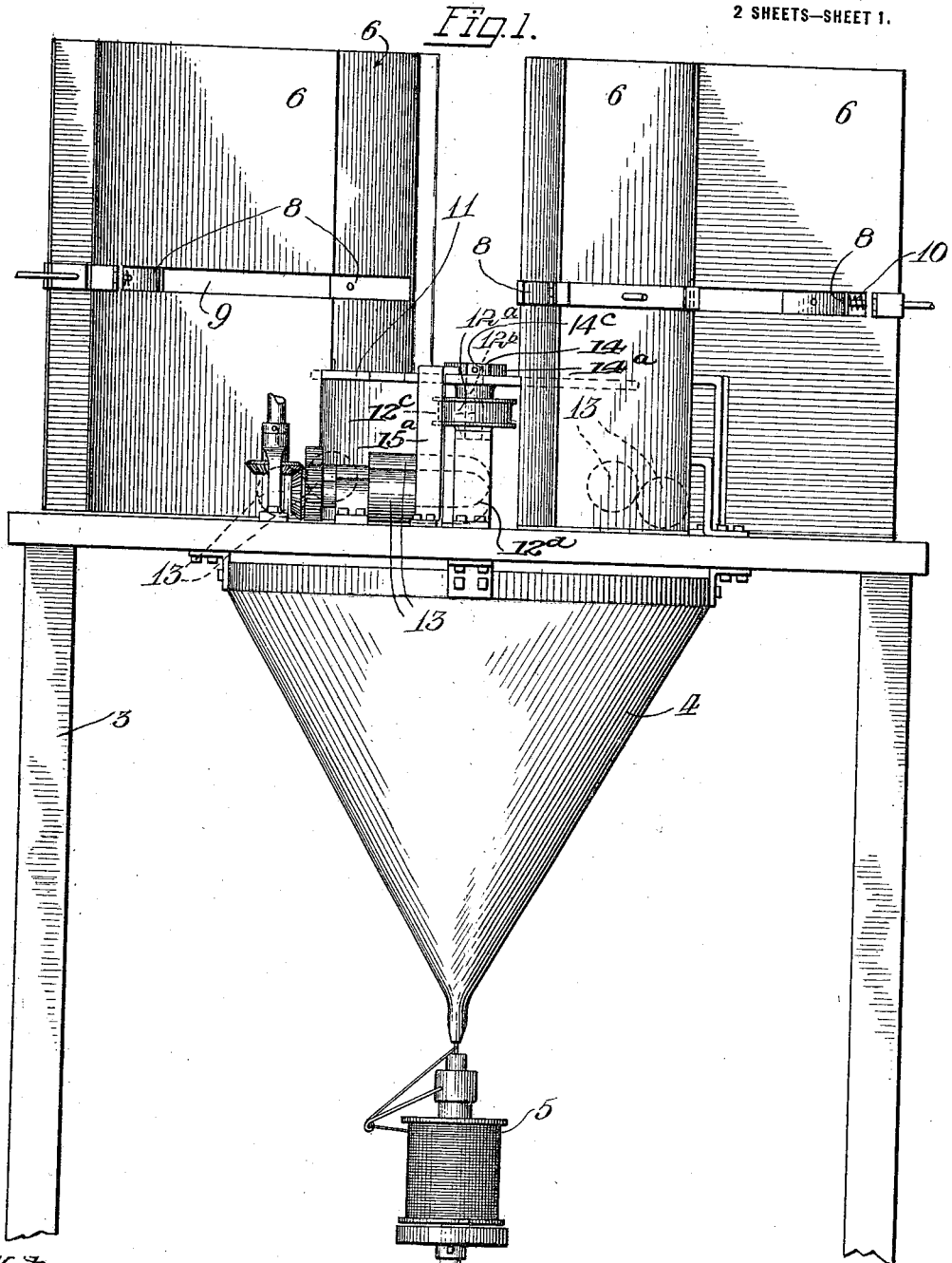

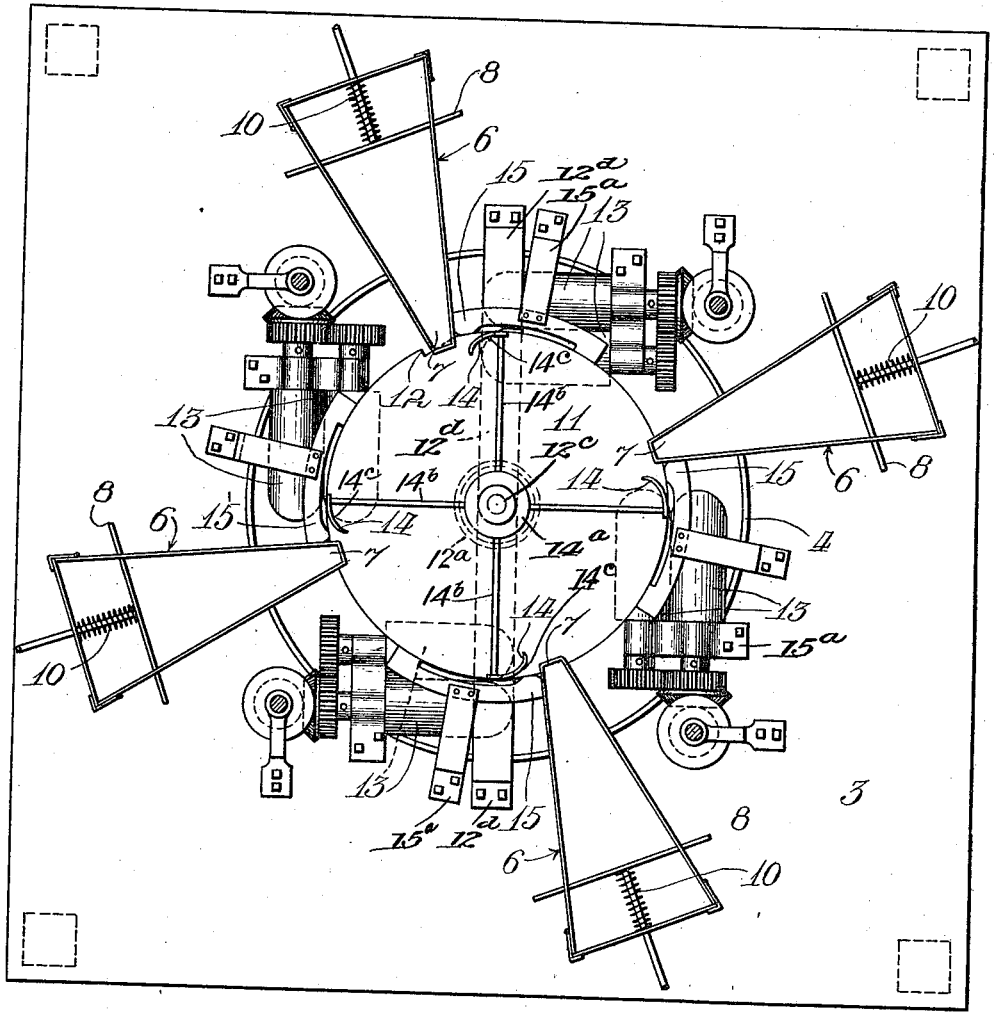

OSSIAN T. WAITE, OF OSHKOSH, WISCONSIN, ASSIGNOR TO WAITE GRASS CARPET COMPANY, OF OSHKOSH, WISCONSIN, A CORPORATION OF WISCONSIN.

GRASS-TWINE MACHINE.

1,144,162.  Specification of Letters Patent.  Patented June 22, 1915.

Application filed October 5, 1912. Serial No. 724,207.

*To all whom it may concern:*

Be it known that I, OSSIAN T. WAITE, a citizen of the United States, residing at Oshkosh, in the county of Winnebago and State of Wisconsin, have invented certain new and useful Improvements in Grass-Twine Machines, of which the following is a specification.

The present invention relates to mechanism for manufacturing grass twine, and deals more particularly with the means for feeding the grasses to the twine forming mechanism, and the selector mechanism for carrying the ends of the grasses out of the holder and delivering them into the bite of the feed rolls.

The objects of the present invention are, to provide a series of holders arranged about a common receptacle or conduit leading to the twine forming mechanism; to provide a set of feed rolls for each holder, which are positioned to discharge into said receptacle or conduit; to utilize a single selector which will be common to all of said holders; to provide means for forcing the grasses out of said selectors at a point adjacent to the feed rolls; and to provide means for guiding and directing the grasses into the bite of said rolls.

The invention further consists in the features of construction and combination of parts hereinafter described and claimed.

In the drawings: Figure 1 is a front elevation of the device of the present invention; and Fig. 2 is a plan view.

In the art to which the present invention relates, it sometimes happens that a mass of grass of a relatively light color will be fed to the forming mechanism and be followed immediately by a mass of grass of relatively dark color. This produces a twine which is streaked, and when such twine is woven into a rug or mat it produces an undesirable article, and difficulty is also experienced owing to the variation in the sizes of the grass; and a mass of short grasses is frequently followed by a mass of long grasses, producing a bunchy or lumpy twine, which obviouly would be undesirable.

In the present invention these difficulties are overcome by providing a series of holders, each of which will contain a single variety of grass, and to continuously feed a portion of the grasses from each holder to the forming mechanism, whereby the grasses which enter the forming mechanism will be of mixed variety and will produce a twine which will have a substantially uniform color throughout and will be of a substantially smooth nature and of uniform size.

Referring to the drawings, the mechanism is illustrated in conjunction with a supporting table 3 of any suitable style and size; and attached to said table is a funnel-shaped conduit or receptacle 4 leading to a suitable twine forming mechanism 5. Supported upon said table and arranged above said conduit are a plurality of grass holders 6 having their forward or discharge ends 7 overlying said conduit. Each of the holders, as shown, is of substantially triangular formation in cross section, and each is adapted to support the grasses contained therein in a substantially vertical position. The grasses are constantly pressed and crowded toward the discharge end of the holder by suitable mechanism, the form illustrated consisting of a bar 8 traveling within slots 9 in the sides of said holder; and said bar is continuously forced toward the discharge end of the holder by means of a coil spring 10. It is understood that it is intended that each of these holders should contain grass of a certain grade, and the number of said holders as many as would be suitable to meet the requirements.

Located above and approximately centrally of said conduit is a disk 11 which is provided with a peripheral notch or notches 12, and said disk may be revolved by any suitable means, as for instance by a belt driven by suitable means actuating a pulley $12^a$ connected to a hub $12^b$ to which the disk is secured. Said hub, pulley and disk are mounted on a stem $12^c$ held stationary in a suitable support $12^d$ the forward or discharge ends of the holders all lie within the path of travel of the notched periphery of said disk, and said notch or notches are for the purpose of selecting a wisp of grass from said holders and deflecting the ends of said wisps out therefrom. For each of the holders 6 I have provided a set of feed rolls 13 of suitable size and formation, which are rotated by any suitable means; and the bite or point of contact of these feed rolls is in the path of travel of the notched periphery of the disk 11, whereby the wisp of grasses carried by said notch is delivered into the bite of said feed rolls by the movements of said disk, and through the instrumentality of said rolls said grasses are withdrawn from the holder and discharged into the receptacle or conduit 4.

By referring to Fig. 1, it will be seen that these feed rolls are positioned in angular relation, so that the grasses, when discharged therefrom, will pass in a substantially direct line to the point of discharge of the conduit or holder, and will thus not become materially disarranged in the feeding operation. It is considered desirable to actuate the feed rolls at a substantially high rate of speed, which practice will spread out the grasses to a certain extent, whereby they will enter the conduit in a somewhat staggered relation, which is a highly desirable method of feeding the grasses to the forming mechanism.

In order to crowd the grasses out from the notch or notches in the selector I have provided a series of members 14 each having a cam shaped surface $14^c$. A rod $14^b$ is attached to each of said members 14, and the rods in turn are fixedly secured to a collar $14^a$ which is secured to the stem $12^c$ and thus the members 14 are fixedly held with respect to the movement of the selector. These members are located adjacent to the point where the grass enters the bite of the feed roll, and the grass when brought in contact with the cam surfaces will be forced out from the selector and into the bite of the roll. I have also provided a slotted plate 15 adjacent each feed roll which plates are held by suitable supports $15^a$, said plates serving as a guide member to guide the grasses into the bite of the roll; and the cam $14^c$ in conjunction with said slotted plates forms a means for guiding the ends of the grasses carried out of holder whereby they will accurately and correctly enter into the bite of the feed rolls.

By the utilization of a single selector mechanism for a plurality of holders, a wisp of grass from each of said holders will be successively discharged therefrom and be fed into the receptacle or conduit, and since the grasses within each holder are of a distinct character, it is obvious that by such an arrangement the grasses discharged into the conduit will be of a mixed nature and will be a combination of different kinds and grades of grasses. Thus the twine formed therefrom will be composed throughout of a mixture of grasses, and will be of a substantially uniform color and size, which, as previously explained, is highly desirable in devices of this nature.

I claim:

1. In a machine of the class described, the combination of a plurality of holders arranged about a common receptacle, feeding means adjacent said holders for advancing the grasses, said means being arranged to discharge into said receptacle and a selector common to all of said holders for delivering the grasses from said holders to said feeding means, said selector acting upon the material in each of the holders in turn, substantially as described.

2. In a machine of the class described, the combination of a plurality of holders arranged about a common receptacle, feeding means for each holder for advancing the grasses, said means being arranged to discharge into said receptacle, a selector common to all of said holders, for delivering the grasses from said holders to said feeding means, and means for forcing the grasses away from said selector and toward said feeding means, substantially as described.

3. In a machine of the class described, the combination of a plurality of holders arranged about a common receptacle, feeding means for each holder for advancing the grasses, said means being arranged to discharge into said receptacle, a selector common to all of said holders, for delivering the grasses from said holders to said feeding means, and means for guiding said grasses toward said feeding means, substantially as described.

4. In a machine of the class described, the combination of a plurality of holders arranged about a common receptacle, feeding means for each holder to advance the grasses, said means being arranged to discharge into said receptacle, a single selector member, and means operatively connected for moving said selector, whereby it moves successively from one holder to another thereby delivering to said receptacle in successive order a wisp of grass from each of the holders, substantially as described.

5. In a machine of the class described, the combination of a plurality of holders arranged about a common receptacle, a set of feed rolls for each holder, arranged to discharge into said receptacle, a single selector member, means operatively connected for moving said selector, whereby it moves successively from one holder to another and delivers to said receptacle in successive order a wisp of grass from each of the holders, and means for forcing said grasses away from said selector and toward the bite of said feed rolls, substantially as described.

6. In a machine of the class described, the combination of a plurality of holders arranged about a common receptacle, a set of feed rolls for each holder, arranged to discharge into said receptacle, a single selector member, means operatively connected for moving said selector, whereby it moves successively from one holder to another and delivers to said receptacle in successive order a wisp of grass from each of the holders, and means for guiding said grasses into the bite of said rolls, substantially as described.

7. In a machine of the class described, the combination of a common receptacle, a plurality of holders arranged about said receptacle, a single selector for all of said holders, positioned approximately centrally of said receptacle, means operatively connected for rotating said selector, and means for advancing the grasses longitudinally of themselves arranged adjacent each of said holders, said advancing means lying in the path of travel of said selector and discharging into said receptacle, substantially as described.

8. In a machine of the class described, the combination of a common receptacle, a notched selecting disk arranged above said receptacle, a plurality of holders having their discharge ends lying in the path of travel of said disk, and a set of feed rolls for each holder, lying in the path of travel of said disk and discharging into said receptacle, substantially as described.

9. In a machine of the class described, the combination of a common receptacle, a notched selecting disk arranged above said receptacle, a plurality of holders having their discharge ends lying in the path of travel of said disk, a set of feed rolls for each holder, lying in the path of travel of said disk and discharging into said receptacle, and means for forcing said grasses away from said selector and toward the bite of said feed rolls, substantially as described.

10. In a machine of the class described, the combination of a common receptacle, a notched selecting disk arranged above said receptacle, a plurality of holders having their discharge ends lying in the path of travel of said disk, a set of feed rolls for each holder, lying in the path of travel of said disk and discharging into said receptacle, and means for guiding said grasses into the bite of said rolls, substantially as described.

11. In a machine of the class described, the combination of a single selector, means operatively connected for actuating said selector, a plurality of holders having their discharge ends arranged in the path of travel of said selector, and means for advancing the selected grasses longitudinally of themselves, arranged in the path of travel of said selector, substantially as described.

12. In a machine of the class described, the combination of a single selector, means operatively connected for actuating said selector, a plurality of holders having their discharge ends arranged in the path of travel of said selector, a set of feed rolls for each holder, arranged in the path of travel of said selector, and means for forcing the grasses from said selector at a point adjacent to said feed rolls, substantially as described.

13. In a machine of the class described the combination of a plurality of holders, a single selector, said selector being arranged to move in a path of travel carrying it crosswise of the grasses in the holders, means operatively connected for actuating said selector, said holders having their discharge ends arranged in the path of travel of said selector, a common receptacle and power driven means for delivering the selected grasses from said selector into said receptacle, substantially as described.

14. In a machine of the class described the combination of a plurality of holders, a single selector, said selector being arranged to move in a path of travel carrying it crosswise of the grasses in the holders, means operatively connected for actuating said selector, said holders having their discharge ends arranged in the path of travel of said selector, a common receptacle and power driven means adjacent each holder for delivering the selected grasses from the selector into said receptacle, substantially as described.

15. In a grass twine machine, the combination of a plurality of holders, a common receptacle, feeding means and a single selector for flexing the grasses from the holders into engagement with the feeding means, said selector moving crosswise of the grasses within the holders and acting to flex grasses from each of the holders in succession and into engagement with said feeding means, substantially as described.

16. In a machine of the class described, the combination of a plurality of holders arranged about a common receptacle, feeding means adjacent said holders for advancing the grasses, said means being arranged to discharge into said receptacle, and means common to all of said holders for delivering the grasses from said holders to said feeding means, said means acting upon the material in each of the holders in turn, substantially as described.

17. In a machine of the class described, the combination of a plurality of holders arranged about a common receptacle, feeding means for each holder for advancing the grasses, said means being arranged to discharge into said receptacle, means common to all of said holders and acting on the material in each of said holders in turn for delivering the grasses from said holders to said feeding means, and means for forcing the grasses away from said delivery means, and toward said feeding means, substantially as described.

18. In a machine of the class described, the combination of a plurality of holders arranged about a common receptacle, feeding means for each holder for advancing the grasses, said means being arranged to discharge into said receptacle, means common to all of said holders and acting on the material in each of said holders in turn, for delivering the grasses from said holders to said feeding means, and means for guiding said grasses toward said feeding means, substantially as described.

OSSIAN T. WAITE.

Witnesses:
D. L. RODERICK,
GEO. J. MYER.

Copies of this patent may be obtained for five cents each, by addressing the "Commissioner of Patents, Washington, D. C."